3,407,166
VINYL CHLORIDE RESINS PLASTICIZED WITH
DIMETHYL FATTY AMIDES

Vincent P. Kuceski, Chicago Heights, and Joseph J. McGuire, South Bend, Ind., assignors of one-half each to C. P. Hall Company of Illinois, Chicago, Ill., a corporation of Ohio, and Uniroyal Inc., a corporation of New Jersey
No Drawing. Continuation of application Ser. No. 528,008, Dec. 2, 1965. This application Feb. 27, 1967, Ser. No. 619,069
4 Claims. (Cl. 260—32.6)

ABSTRACT OF THE DISCLOSURE

Vinyl chloride polymer and copolymer compositions are plasticized with N,N-dimethyl amides of fatty acids containing 12 to 18 carbon atoms. The extractability of the dimethyl amides with hexane is surprisingly less than that of the diethyl amides. Plasticization is improved by adding a small amount of a polyester.

This aplication is a continuation of application Ser. No. 528,008 (now abondoned) which in turn is a continuation-in-part of our application Ser. No. 179,029 filed Mar. 12, 1962 (now abandoned).

---

This invention relates to a class of plasticizers for polyvinyl chloride and copolymers of vinyl chloride containing a major proportion of vinyl chloride units and a minor proportion of other units which may be other vinyl units such as vinylidene chloride and vinyl acetate. (Polyvinyl chloride and the copolymers of vinyl chloride will be referred to as vinyl chloride polymers in the remainder of the specification and the claims.) This invention is more particularly concerned with compositions of matter obtainable by the use of such plasticizers.

This invention is more particularly concerned with compositions of matter comprising vinyl chloride polymers plasticized with the N,N-dimethyl amides of fatty acids of the class consisting of N,N-dimethyl lauramide, N,N-dimethyl myristamide, N,N-dimethyl oleamide, N,N-dimethyl linoleamide, N,N-dimethyl linolenamide, and mixtures of such amides. We have discovered that such amides are effective plasticizers to a surprising degree for vinyl chloride polymer resins as contrasted to the effectiveness of the diethyl and higher dialkyl amides of the same acids and other presently employed plasticizers.

This application is a continuation-in-part of our application Ser. No. 179,029 filed Mar. 12, 1962 (now abandoned).

This invention relates to a class of plasticizers for polyvinyl chloride and copolymers of vinyl chloride containing a major proportion of vinyl chloride units and a minor proportion of other units which may be other vinyl units such a vinylidene chloride and vinyl acetate. (Polyvinyl chloride and the copolymers of vinyl chloride will be referred to as vinyl chloride polymers in the remainder of the specification and the claims.) This invention is more particularly concerned with compositions of matter obtainable by the use of such plasticizers.

This invention is more particularly concerned with compositions of matter comprising vinyl chloride polymers plasticized with the N,N-dimethyl amides of fatty acids of the class consisting of N,N-dimethyl lauramide, N,N-dimethyl myristamide, N,N-dimethyl oleamide, N,N-dimethyl linoleamide, N,N-dimethyl linolenamide, and mixtures of such amides. We have discovered that such amides are effective plasticizers to a surprising degree for vinyl chloride polymer resins as contrasted to the effectiveness of the diethyl and higher dialkyl amides of the same acids and other presently employed plasticizers.

We have found that the preferred amides used as a plasticizer in vinyl chloride polymer compositions exclude the more volatile members, such as the N,N-dimethyl caproamide, N,N-dimethyl caprylamide and the N,N-dimethyl capramide, since they would tend to evaporate from the plasticized article on standing over a period of time or under the influence of heat and the article would thus lose its flexibility and become hard and brittle. Also, the higher saturated members of the series, such as the N,N-dimethyl palmitamide, N,N-dimethyl stearamide, N,N-dimethyl arachidamide and the N,N-dimethyl behenamide have limited compatibility in vinyl chloride polymer resins and exude if these amides are the sole plasticizer or if more than about 10 to 20 parts of these amides per 100 parts of resin is used.

The amides which show high efficiency and compatibility include the following amides: N,N-dimethyl oleamide, N,N-dimethyl linolenamide, N,N-dimethyl linoleamide, N,N-dimethyl lauramide and N,N-dimethyl myristamide. Mixtures of the foregoing are also highly efficient and compatible with vinyl chloride polymers. These amides are surprisingly more resistant to extraction by organic solvents than the diethyl and higher amides of the same acids.

The N,N-dimethyl amides of the higher molecular weight unsaturated fatty acids are liquids and the amides of the commercial acid mixtures which are composed largely of such amides are liquids and compatible with the vinyl chloride polymers. Also the commercial N,N-dimethyl amide mixtures composed largely of amides of fatty acids containing 12 or 14 carbon atoms are liquid at about room temperature whereas amides of the saturated acids of higher carbon content are solid and less compatible with vinyl chloride polymers.

Such mixtures may be derived from certain naturally occurring oils, especially those oils containing reasonably high proportions of oleic acid, linoleic acid, linolenic acid, lauric acid and myristic acid. The amide may thus be derived from oils such as cottonseed, palm, soybean, corn, tallow, olive, linseed, peanut, sesame, safflower, sperm, menhaden and coconut.

The $-CON(CH_3)_2$ group on an aliphatic chain alone confers the compatibility and incompatibility factors which are necessary in effective plasticizers. The dimethyl group on the nitrogen atom increases the polarity of the amide molecule which renders the amide more compatible with the vinyl chloride polymer.

The vinyl chloride polymers and copolymers plasticized with the amides of this invention show improved properties such as high plasticizer efficiency, low cold crack properties, excellent anti-static properties and as compared with other diamides exceptionally low hexane extraction. These improved properties are obtained by the incorporation of the amides of the present invention within the vinyl chloride compositions in an amount from 10 to 100 parts by weight of the amides, based on 100 parts by weight of the vinyl chloride. However, for most uses, the amount of amides to be used will be from about 30 to about 80 parts by weight.

It is further contemplated that desired properties imparted by the amide plasticizers of the present invention can be conferred by using smaller amounts of amide plasticizer along with other plasticizers. Other plasticizers which may be used for this purpose include the following: dioctyl phthalate, dioctyl azelate and other carboxylic acid esters such as adipates, for example dioctyl adipate and sebacates, for example dioctyl sebacate; polyester reaction products of dicarboxylic acids and polyols, (which may or may not be modified with monocarboxylic acids and monofunctional alcohols) such as the products which are sold under the trade names Paraplex G54, Plastolein 9722 and Hallco HA5A; and phosphate plasticizers such as trioctyl phosphate and tricresyl phosphate.

Other additives such as pigments, fillers, stabilizers, and antioxidants may be added to the composition of the present invention.

The following Examples 1A, 1B and 1C teach a method of preparing the plasticizers of the present invention.

In the following examples all percentages are based upon weight unless otherwise indicated.

EXAMPLE 1A.—N,N-dimethyl oleamide was prepared according to the teachings of Belgian Patent 604,813 issued Dec. 11, 1961, the disclosure of which is incorporated herein by reference, from commercial methyl oleate having the following approximate analysis:

| | Percent |
|---|---|
| Methyl myrisate | 5 |
| Methyl palmitate | 5 |
| Methyl stearate | 5 |
| Methyl oleate | 80 |
| Methyl linoleate | 5 |
| Total | 100 |

Four hundred pounds of the aforementioned mixture was introduced into a 100-gallon reactor and reacted with 70 pounds of dry dimethyl amine which was added in liquid form at 25° C. over a period of two hours, in the presence of an alkali metal alkoxide (sodium methoxide) in an amount from 0.1 to 1.0 percent based on the weight of the commercial methyl oleate present in the reactor. The mixture was stirred for six hours at a temperature of 40° C. The reaction mass was then stripped of methanol and excess amine. The catalyst was then neutralized with sulfuric acid, and the reaction mass was filtered with a diatomaceous-silicate filtering aid to remove inorganic salts. The resulting mixture was then distilled in a wiped film molecular still at 500 microns pressure (mercury) at 195° C. to yield a commercial N,N-dimethyl oleamide, known as Hallcomid M 18–OL, with the following analysis:

TABLE 1A.—AMIDE ANALYSIS
[Freezing point (−8° C.)]

| | Percent |
|---|---|
| N,N-dimethyl oleamide | 80 |
| N,N-dimethyl myristamide | 5 |
| N,N-dimethyl palmitamide | 5 |
| N,N-dimethyl stearamide | 5 |
| N,N-dimethyl linoleamide | 5 |
| | 100 |

Total amide 95%

Residual Ester Analysis

| | Percent |
|---|---|
| Methyl oleate | 80 |
| Methyl ester of saturated fatty acid | 20 |
| | 100 |

Total ester 5%

EXAMPLE 1B.—N,N-dimethyl lauramide. The following commercial ester was converted to the corresponding N,N-dimethyl amide by the reaction, in the same manner as described in Example 1A, using 400 pounds of a mixture of 90 precent methyl laurate, 8 percent methyl myristate, and 2 percent methyl caproate with 107 pounds of dimethyl amine in the presence of the catalyst. The resulting mixture comprised 95 percent amide and 5 percent residual ester and had a freezing point of 14–16° C. This is Hallcomid M–12.

EXAMPLE 1C.—N,N-dimethyl oleamide-stearamide. Four hundred pounds of a mixture of the methyl esters of the following composition: 60% methyl oleate, 20% methyl stearate, 10% methyl linoleate, and 10% methyl palmitate, was reacted with 70 pounds of dimethyl amine in the same manner as disclosed in Example 1A to yield 95 percent of the corresponding amide compositions, the remaining 5 percent being unconverted methyl esters of the above-mentioned materials. The freezing point was about 30° C.

It should be understood that in the examples given above, the total amide content may range from 90 percent to 100 percent with the residual ester content being as much as 10 percent or as low as 0 percent. It should be particularly noted that the product of Examples 1A, 1B and 1C yields an amide with no acid and any unreacted material being an ester.

The following examples show the improved properties of vinyl chloride compositions containing the N,N-dimethyl amide plasticizers of the present invention.

EXAMPLE 2.—DETERMINATION OF PLASTICIZER EFFICIENCIES

The efficiency of a plasticizer may be defined as the amount of plasticizer (parts of plasticizer per 100 parts vinyl resin) which will give approximately the same degree of flexibility and stretch to a vinyl compound as will 100 parts of a standard plasticizer.

The general flexibility and stretch of a flexible film can be measured by obtaining the modulus, which may be defined as the pounds per square inch required to stretch the film a given percent of its original length. Modulus data obtained for efficiency determinations is obtained at 100 percent elongation, which is the lbs./sq. in. required to stretch the film to twice its original length. Since the modulus of a flexible film is a measure of its general flexibility and stretch, the efficiency of a vinyl plasticizer may then be defined as the parts of plasticizer per 100 parts of vinyl resin required to produce a vinyl sheet having the same modulus as a vinyl sheet containing 100 parts of a standard plasticizer.

The efficiencies shown in this discussion are all referred to dioctyl phthalate (DOP) as the standard plasticizer. Thus, when we say that a plasticizer such as dioctyl azelate (DOZ) has an efficiency of 84 we mean that a vinyl sheet containing 100 parts of vinyl resin and 84 parts of DOZ has the same modulus as a vinyl sheet containing 100 parts of the same vinyl resin and 100 parts of DOP.

The relative amounts of a plasticizer equivalent to DOP do not have to be referred to a 100 part DOP level. For example, if the efficiency of DOZ is 84, we could expect a vinyl sheet containing 100 parts of a vinyl resin and 42 parts of DOZ would ordinarily have the same modulus as a vinyl sheet containing 100 parts of the same vinyl resin and 50 parts of DOP.

In determining efficiences of the plasticizers to be discussed a control formulation is used as is given in the following table.

TABLE 2A

| | Parts by weight |
|---|---|
| Marvinol VR–31 | 91.00 |
| Vinylite VYHH | 9.00 |
| Stabilizer | 2.06 |
| Calcium stearate | 0.88 |
| DOP | 50.00 |
| | 152.94 |

Marvinol VR–31 is a high molecular weight straight polyvinyl chloride resin supplied by the U.S. Rubber Co., Naugatuck Chemical Division.

"Vinylite" VYHH is a polyvinyl chloride-polyvinyl acetate copolymer containing 87 percent polyvinyl chloride and 13 percent polyvinyl acetate supplied by the Bakelite Division of Union Carbide Co.

A suitable stabilizer used commercially is Ferro BW–24, a barium, cadmium, zinc stabilizer for polyvinyl chloride, supplied by the Ferro Chemical Corporation.

Calcium stearate is a lubricant and processing aid.

The ingredients in the above formulation are weighed together in a pan and preblended. They are then milled in a 2- roll mill at 310° F. −320° F. for 4 to 5 minutes. The fused mixture is then sheeted out to give a 25 mil film.

The same procedure is followed in preparing samples of the plasticizer whose efficiences are to be determined. The same materials are used in the formulations except, various levels of the plasticizer being tested are substituted for the DOP. Such are prepared at various levels of the plasticizer being tested.

In all instances care is taken to keep conditions such as temperature, milling time and gauge as uniform as possible.

The 25 mil vinyl film samples are then tested for modulus at 100% elongation using ASTM method D-412-51-T-Die A.

After obtaining the modulus data, the efficiency is determined as follows:

(1) The modulus is plotted on a graph against the corresponding parts of plasticizer per 100 parts of vinyl resin. A curve is then obtained showing how the modulus varies as the amount of plasticizer in the compound increases.

(2) By reading along the curve to the modulus value corresponding to the modulus obtained for the formulation containing 50 parts of DOP we can determine the parts of plasticizer which would give an equivalent modulus. This value is then multiplied by 2 to give the parts equivalent to 100 parts of DOP. This is the efficiency of the plasticizer.

Using the method described above, efficiency data was obtained on various plasticizers as is indicated in the following table:

TABLE 2B

| Plasticizer: | Efficiency |
|---|---|
| Dioctyl phthalate (DOP) | 100 |
| Dioctyl azelate (DOZ) | 84 |
| Hallcomid M-18 [1] | 87 |
| Hallcomid M-12 [1] | 72 |
| Hallcomid M 18-OL [1] | 73 |
| Diethyl lauramide | 72 |
| Diethyl oleamide | 74 |
| Plastolein 9722 | 113 |
| Paraplex G-54 | 121 |

[1] Hallcomid is a trademark of The C. P. Hall Company of Illinois for its N,N-dimethyl amides of fatty acids. Compositions are described below.

In the above table dioctyl azelate is a diester plasticizer of well known composition. Hallcomid M-18 is an example of a largely saturated N,N-dimethyl amide containing N,N-dimethyl stearamide and N,N-dimethyl palmitamide, along with smaller amounts of N,N-dimethyl myristamide and N,N-dimethyl oleamide, the amount of the N,N-dimethyl stearamide can be between 30 to 70 percent, and the amount of palmitamide can also be between 30 and 70 percent. In the example given above the composition for Hallcomid M-18 is as follows: N,N-dimethyl stearamide 50%, N,N-dimethyl palmitamide 40%, N,N-dimethyl myristamide 5% and N,N-dimethyl oleamide 5%. The composition of the Hallcomid M-12 may contain up to 100 percent N,N-dimethyl lauramide. It may contain small amounts of N,N-dimethyl myristamide and N,N-dimethyl capramide. A discussion of the "Hallcomid" M 18-OL sample is given in Example 1A of this application.

"Plastolein" 9722 is a polyester of the class obtained from the condensation of dicarboxylic acids with polyols; such as when adipic and azelaic acid is reacted with ethylene glycol or propylene glycol to give a polyester polymer of higher molecular weight. "Paraplex" G-54 is another polyester of higher molecular weight.

It is easily seen in Table 2B that Hallcomid M-12 and Hallcomid M 18-OL, amides of this invention, have a high efficiency even when compared with dioctyl azelate.

EXAMPLE 3.—COLD CRACK

Cold crack data were obtained on the same formulations referred to under Example 2, sheeted out to 25 mil thickness with each of the plasticizers listed in Table 2B.

The Masland Cold Crack method was used. The details of this method are described in the Vinyl Fabrics Institute Manual.

These data are summarized below in Table 3A.

TABLE 3A

| Plasticizer (70 phr.) | Masland Cold Crack, °. F.[1] | | | | | | | | |
|---|---|---|---|---|---|---|---|---|---|
| | +20 | +10 | 0 | −10 | −20 | −30 | −40 | −50 | −60 |
| DOP | | | E | E | C | AA | | | |
| DOZ | | | E | E | | D | E | AA | |
| Hallcomid M-12 | | | | | E | | E | D | D |
| Hallcomid M 18-OL | | | E | E | | E | E | E | D |
| Diethyl lauramide | | | | | | | E | E | E |
| Diethyl oleamide | | | | | | E | E | E | D |
| Plastolein 9722 | | D | AA | | | | | | |
| Paraplex G-54 | C | AA | AA | | | | | | |

[1] Code.—AA=shattered—3 or more pieces; A=cracked into 2 pieces; B=cracked; C=fine cracks long fold; D=one or two small cracks; E=no visible effect.

The above Table 3A clearly shows the marked advantages of the dialkyl amides. Thus DOP is good only to −30° F. DOZ is good to −50° F. and this has previously been considered as the best material available. Plasticizers Plastolein 9722 and Paraflex G-54 have a very poor cold crack characteristic. On the other hand vinyl resins plasticized with dialkyl amides do not shatter even at −60° F.

It is therefore apparent that the amide plasticizers not only show unusually high plasticizing efficiency but also show excellent cold crack properties.

Even when compared with DOP on an equal modulus basis, Table 3C shows the superiority of the Hallcomids. For this purpose the following formula was used, employing different amounts of the different plasticizers in order to give the same modulus:

TABLE 3B

| | Parts by weight |
|---|---|
| Marvinol VR-31 | 100.00 |
| Stabilizer | 2.35 |
| Calcium stearate | 0.88 |
| Plasticizer—as shown in Table 3C | |

TABLE 3C

| Plasticizer | Parts per 100 parts resin | Masland Cold Crack, ° F. | | | | |
|---|---|---|---|---|---|---|
| | | −20 | −30 | −40 | −50 | −60 |
| DOP | 70. | E | E | AA | | |
| Hallcomid M 18-OL | 51. | E | E | D | D | C |
| Hallcomid M-12 | 50.5 | E | E | E | C | C |

Ordinarily increasing the plasticizer level of a vinyl composition improves the cold crack properties. The above table shows, however, that even though the DOP formulation contains 20 parts more of plasticizer, its cold crack fails at −40° F., whereas the Hallcomid formulations containing less plasticizer do not shatter at −60° F.

EXAMPLE 4.—RESISTANCE TO HEXANE EXTRACTION

The following formulation was used in obtaining the resistance to hexane extraction of DOP.

TABLE 4A

| | Parts by weight |
|---|---|
| Marvinol VR-31 | 100.00 |
| Stabilizer | 2.35 |
| Calcium stearate | 0.88 |
| DOP | 70.00 |
| | 172.23 |

The stabilizer used was Advastab BC-104-D, a barium-cadmium-zinc stabilizer for vinyl resins, supplied by Advance Solvents Chemical Co. It is equivalent to Ferro BW-24 described in Example 2.

The same formulation was used in obtaining the hexane extraction of other plasticizers, except 70 parts of the plasticizer being tested was substituted for 70 parts of DOP.

The above formulations were mixed, milled and sheeted out to 25 mil as is described in Example 2.

The hexane extraction test was performed as described in Federal Specification CCCA-700-B, pp. 4.4.5.1. The results are reported as percent loss in weight of the sample (due to extraction of the plasticizer).

The hexane extraction of various plasticizers is given in Table 4B below.

TABLE 4B

| Plasticizer (70 phr.): | Hexane extraction (percent wt. loss) |
|---|---|
| DOP | 27.51 |
| DOZ | 34.33 |
| Hallcomid M-12 | 22.54 |
| Hallcomid M 18-OL | 23.21 |
| N,N-diethyl lauramide | 27.6 |
| N,N-diethyl oleamide | 32.3 |
| Plastolein 9722 | 1.94 |
| Paraplex G-54 | 0.57 |

The above table shows that the resistance to hexane extraction of the dialkyl amides is superior to that of DOP or DOZ in addition to the fact that they are more efficient plasticizers as shown in Table 2B. This is an entirely unexpected result because it is known that hexane extraction resistance of efficient plasticizers is usually very poor. Although Plastolein 9722 and Paraplex G-54 have excellent resistance to hexane extraction they have very poor efficiencies as plasticizers. This hexane extraction test is a standard in the industry to determine the solvent resistance of plasticizers in vinyl sheeting to indicate the suitability of sheetings for exposure to organic solvents in the various uses of such sheeting.

An illustration is given below of how the improvement in resistance to hexane extraction is even more marked if we take advantage of the high efficiencies of the amides of this invention and compare them with DOP at equal modulus levels (equal efficiency levels).

The following compositions were compared:

TABLE 4C

| | Parts by Weight | | |
|---|---|---|---|
| | A | B | C |
| VR-31 | 91.00 | 91.00 | 91.00 |
| VYHH | 9.00 | 9.00 | 9.00 |
| Ferro BW-24 | 2.06 | 2.06 | 2.06 |
| Calcium stearate | 0.88 | 0.88 | 0.88 |
| DOP | 70.00 | | |
| Hallcomid M 18-OL | | 51.0 | |
| Hallcomid M-12 | | | 50.50 |

The three plasticizers listed above have the same modulus and general degree of flexibility—such as would be desired in a commercial vinyl upholstery material but the hexane resistance is quite different as is shown in the following table, where the hexane extraction of Formula B and C is about one-half that of A.

TABLE 4D

| Formula Code | Phr. | Plasticizer | Hexane Extraction (percent wt. loss) |
|---|---|---|---|
| A | 70.0 | DOP | 32.31 |
| B | 51.0 | Hallcomid M 18-OL | 17.09 |
| C | 50.5 | Hallcomid M-12 | 13.42 |

Superiority of dimethyl amides compared to diethyl amides in standard hexane extraction tests Table 2B shows that diethyl lauramide and oleamide have the same or substantially the same efficiency as Hallcomids M-12 and M 18-OL. Table 3A shows that the cold crack tests on these diethyl amides and Hallcomids are substantially the same. Actually the diethyl amides shattered completely into three or more pieces at −70° F., so had no better crack resistance than the Hallcomids.

In view of this similarity in the efficiency and low temperature properties, it is surprising that the hexane extraction on the vinyl sheeting containing the Hallcomids is so much better than on the sheeting containing the diethyl amides. This is most evident on a comparison of the amount of plasticizer remaining in the sheeting on completion of the extraction test. There was 70 parts of each plasticizer in the respective sheetings; the plasticizer content being 40.7 percent. The amounts of plasticizer extracted from the sheeting in each test is subtracted from this value to give the amount of plasticizer remaining in the various test samples, as recorded in the following table.

TABLE 4E

| | Percent Plasticizer | |
|---|---|---|
| | Original | After Extraction |
| Hallcomid M-12 | 40.7 | 18.16 |
| Hallcomid M 18-OL | 40.7 | 17.49 |
| Diethyl Lauramide | 40.7 | 13.1 |
| Diethyl Oleamide | 40.7 | 8.4 |

The above table shows that the prolonged hexane extraction tests extracted only about one-half of Hallcomids M-12 and M 18-OL, whereas the hexane extraction removed approximately three-fourths of the diethyl lauramide and approximately four-fifths of the diethyl oleamide. Very likely all of the diethyl amides would have been removed if it were not so difficult to extract the last vestiges of almost any compound from a polyvinyl plastic. If we describe the above results in terms of percentages, it is noted that the amount of Hallcomid M-12 and M 18-OL left in the polyvinyl sheeting is over 100 percent greater than that of the diethyl oleamide and at least 50 percent greater than the diethyl lauramide.

EXAMPLE 5

This example illustrates the effect of Hallcomid M 18-OL on the modulus and hexane extraction test when blends of the Hallcomid M 18-OL and Paraplex G-54 are used compared to blends of dioctyl azelate and Paraplex G-54. All blends contain 70 phr. of plasticizer.

TABLE 5A
[Paraplex G-54 Blends—70 parts total plasticizer]

| | Column 1 | Column 2 | Column 3 | Column 4 | Column 5 |
|---|---|---|---|---|---|
| Percent G-54 in Blend | Percent M 18-OL or DOZ | Modulus at 100% | | Hexane Extraction | |
| | | G-54/M 18-OL | G-54/DOZ | G-54/M 18-OL | G-54/DOZ |
| 100 | [1] 0 | 1,649 | 1,649 | 0.57 | 0.57 |
| 75 | 25 | 994 | 1,278 | 1.64 | |
| 50 | 50 | 763 | 993 | 3.86 | 7.26 |
| 25 | 75 | 584 | 948 | 7.11 | 18.75 |
| 0 | 100 | 520 | 815 | 23.21 | 34.33 |

[1] Control.

Table 5A shows the results obtained when blends of different plasticizers are used in polyvinyl resin compositions. Blends of Hallcomid M 18–OL were made with Paraplex G–54 and then formulated as given in Table 3A. Column 1 shows the percentage of each plasticizer in the blends. The total amount of plasticizer used is 70 parts per hundred parts of resin (phr.). Thus in a blend containing 75 percent Paraplex G–54 the percentage of Hallcomid M 18–OL or DOZ as the case may be is 25 percent. The phr. of Paraplex G–54 would be 52.5 phr., while the phr. of Hallcomid M 18–OL or DOZ would be 17.5.

Columns 2 and 3 compare the effect on the modulus of a vinyl chloride polymer resin composition containing Paraplex G–54 plasticizer when increasing amounts of Hallcomid M 18–OL and DOZ are added. This shows that the incorporation of 25 percent of Hallcomid M 18–OL based on total plasticizer or 17.5 parts of Hallcomid M 18–OL and 52.5 phr. Paraplex G–54 gives a vinyl chloride polymer composition having a modulus of 994 or about 60 percent of the control sample containing only Paraplex G–54. On the other hand, incorporation of the same proportions of DOZ under the same conditions gives a modulus of 1278, or about 78 percent of the control. In other words the Hallcomid M 18–OL lowers the modulus 40 percent while the DOZ only lowers it 22 percent. Since DOZ is considered to be one of the most efficient plasticizers it is again shown that the amide plasticizers of the present invention continue to show a superiority by a factor of about 2 even in a blend such as this.

This superiority continues at the 50 percent and 75 percent levels as shown in the table. When 50 percent Hallcomid M 18–OL and 50 percent Paraplex G–54 are used the modulus obtained is 763 which is about 46 percent of the control; a lowering of 54 percent. The same proportion of DOZ only lowers it to 993 or 60 percent of the control modulus; a lowering of only 40 percent. Thus, 25 percent Hallcomid M 18–OL is equal to 50 percent DOZ in its efficiency as a plasticizer in this blend.

When 75 percent Hallcomid M 18–OL is used the modulus is lowered all the way to 584 whereas DOZ in the same amount lowers only slightly to 948. Thus 75 percent Hallcomid M 18–OL lowers the modulus to about 35 percent of the control value, thus lowering the modulus about 65 percent, while 75 percent DOZ lowers it to only about 58 percent of the control value, a lowering of only about 42 percent. The power of the amide plasticizer of this invention to plasticize compositions in blends is not in itself astonishing as the previous examples have demonstrated their remarkable efficiency. The surprising results obtained here, however, show that when blends of standard plasticizers and the amides of the present invention are used there is a superiority of plasticizing efficiency greater than that indicated in Table 2B where Hallcomid M 18–OL is given an efficiency rating of 73 while DOZ has a rating of 84. According to this table the efficiency of Hallcomids M 18–OL or M–12 is better than DOZ by a factor of 84/72 or about 1.16, which in itself is considered very good.

Table 5B utilizes modulus figures given above and shows the increased plasticizing effect of Hallcomid M 18–OL in mixtures with a polymeric plasticizer such as G–54 and the effect of DOZ in comparison.

TABLE 5B

| Percent Hallcomid M 18–OL or DOZ | Percent G–54 | Percent Modulus decrease | |
|---|---|---|---|
| | | M18–OL | DOZ |
| 25 | 75 | 40 | 22 |
| 50 | 50 | 54 | 40 |
| 74 | 25 | 65 | 42 |

Thus, it can be seen that small amounts of the amides of this invention and a polymeric plasticizer exhibit a synergistic plasticizing effect. This is evidenced by the fact that whereas an increase in efficiency of 1.16 times is shown as expected, the efficiencies are increased to 1.80, 1.35 and 1.55 times, respectively.

The resistance to hexane extraction also shows this surprising synergistic effect, as recorded in columns 4 and 5 of Table 5A. The figures show that as the percent of Hallcomid M 18–OL or DOZ is increased the amount extracted by hexane increases. However, the percent increase, based on the amount extracted from blends containing M 18–OL is much less than for blends containing DOZ. This is shown in Tables 5C and 5D where the percentages of extracted plasticizer are taken from Table 5A. The last column compares the plasticizer extracted from blends with the extracted from blends wih the extraction from a material plasticized with only M 18–OL or DOZ.

TABLE 5C.—HEXANE EXTRACTION

| Blend, Percent | | Percent Extracted | Percent of Total Extracted of M 18–OL Based on Extraction of 23.21% |
|---|---|---|---|
| G–54 | M 18–OL | | |
| 100 | 0 | 0.57 | ----- |
| 75 | 25 | 1.64 | 7.1 |
| 50 | 50 | 3.86 | 16.6 |
| 25 | 75 | 7.11 | 30.6 |
| 0 | 100 | 23.21 | 100.0 |

TABLE 5D

| Blend, Percent | | Percent Extracted | Percent of Total Extracted of DOZ Based on Extraction of 34.33% |
|---|---|---|---|
| G–54 | DOZ | | |
| 100 | 0 | 0.57 | ----- |
| 75 | 25 | ----- | ----- |
| 50 | 50 | 7.26 | 21.0 |
| 25 | 75 | 18.76 | 55.0 |
| 0 | 100 | 34.33 | 100.0 |

None of the DOZ blends compares with the amide plasticizer blends. When larger percentages are used the resistance to hexane extraction is somehow synergistically increased when amide is used.

TABLE 5E
[Paraplex G–54 Blends—70 Parts Total Plasticizer]

| Column 1 | | Column 2 | | | | | | | | | Column 3 | | | | | | | | |
|---|---|---|---|---|---|---|---|---|---|---|---|---|---|---|---|---|---|---|---|
| Percent | | G–54/M 18-OL | | | | | | | | | G–54/DOZ | | | | | | | | |
| G–54 in Blend | M 18–OL or DOZ | +20 | +10 | 0 | −10 | −20 | −30 | −40 | −50 | −60 | +20 | +10 | 0 | −10 | −20 | −30 | −40 | −50 | −60 |
| 100 | 0 | C | AA | AA | | | | | | | C | AA | AA | | | | | | |
| 75 | 25 | | | D | D | AA | | | | | | | D | A | AA | AA | | | |
| 50 | 50 | | | E | E | | D | AA | | | | | E | C | AA | AA | | | |
| 25 | 75 | | | E | E | | E | E | E | C | | | | | E | D | D | A | |
| 0 | 100 | | | E | E | | E | | E | | | | E | E | D | D | E | AA | |

The effect on low temperature properties of the same formulations is also shown in columns 2 and 3 of Table 5E. It is easily seen that the amides of this invention impart superior low temperature properties to Paraplex G–54 in polyvinyl chloride compositions. Thus when the same code is followed as given in Table 4 the incorporation of 25 percent Hallcomid M18–OL lowers the cold crack temperature from +10° F. to −20° F. At the 75 percent level no shattering occurs even at −60° F. Column 3 shows that DOZ also lowers the cold crack. However, the degree of lowering is far inferior to Hallcomid M18–OL. For example, at the 50 percent level the cold crack for Hallcomid M18–OL does not occur until −40° F. whereas the cold crack for the DOZ blend is only −20° F.

The information in Example 5 is shown in the drawing. Curves are given for modulus, hexane extraction, and cold crack. The curves show graphically the greater improvements obtained as a greater proportion of Hallcomid comprises the 70 parts plasticizer blend, even when these are compared with a plasticizer considered the most efficient heretofore available. From this figure a formulator can select the properties he most desires. Thus he can select the right combination of modulus, cold crack, and hexane extraction and get the formulation required from the chart. Since the lower figures are most often desired, the Hallcomid M18–OL would ordinarily be selected since they are most efficient with respect to modulus, hexane extraction and cold crack qualities.

sistance to hexane extraction is also synergistically improved. In Table 6B the cold crack tests show, as before, the improvements obtained by the addition of Hallcomids M18–OL or M–12 to the polymeric plasticizer polyvinyl chloride compositions.

TABLE 6A
[Plastolein 9722 Blends—70 Parts Total Plasticizer]

| Percent 9722 in Blend | Modulus at 100% | | | Hexane Extraction | | |
|---|---|---|---|---|---|---|
| | 9722/M 18–OL | 9722/ M–12 | 9722/ DOZ | 9722/M 18–OL | 9722/ M–12 | 9722/ DOZ |
| 100 | 1,450 | 1,450 | 1,450 | 1.94 | 1.94 | 1.94 |
| 75 | 917 | 929 | 1,411 | 3.75 | 4.57 | 3.79 |
| 50 | 689 | 699 | 1,191 | 6.48 | 7.39 | 10.50 |
| 25 | 578 | 572 | 953 | 11.05 | 11.92 | 22.34 |
| 0 | 520 | 491 | 815 | 23.21 | 22.54 | 34.33 |

TABLE 6B
[Plastolein 9722 Blends—70 Parts Total Plasticizer]

| Percent 9722 in Blend | Masland Cold Crack | | | | | | | | | | | | | | | | | | | | | |
|---|---|---|---|---|---|---|---|---|---|---|---|---|---|---|---|---|---|---|---|---|---|---|
| | 9722/M 18–OL | | | | | | | | 9722/M–12 | | | | | | | | 9722/DOZ | | | | | |
| | +10 | 0 | −10 | −20 | −30 | −40 | −50 | −60 | +10 | 0 | −10 | −20 | −30 | −40 | −50 | −60 | +10 | 0 | −10 | −20 | −30 | −40 −50 |
| 100 | D | AA | | | | | | | D | AA | | | | | | | D | AA | | | | |
| 75 | | E | D | D | AA | | | | | | | | | | | | | B | AA | AA | AA | |
| 50 | | E | E | D | AA | | | | | | | | | | | | | B | AA | AA | | |
| 25 | | E | E | E | D | D | D | | | | | | | | | | | | E | C | A | |
| 0 | | E | E | E | E | E | D | | | E | E | D | D | | | | E | E | D | D | AA | AA |

Example 6.—Plastolein 9722 blends with the amide plasticizer of the present invention In this example, another polymeric plasticizer commonly used was blended with Hallcomid M18–OL and Hallcomid M–12 in the same way as in Example 5 and formulated as given in Table 3A.

Tables 6A and 6B show the results obtained. The substantial improvement in modulus is shown in Columns 2 and 3 when Hallcomids M18–OL and M–12 are used. Re-

EXAMPLE 7

Tables 7A and 7B show the results obtained when blends of two different common plasticizers are made with the Hallcomids and with each other. The vinyl chloride polymer compositions were made with the formulation given in Example 3, Table 3A but different proportions of the amides, Hallcomids M 18–OL and M–12, are used with DOP and DOZ.

TABLE 7A
[DOP—Blends—70 Parts Total Plasticizer]

| Column 1 | Column 1a | Column 2 | Column 3 | Column 4 | Column 5 | Column 6 | Column 7 |
|---|---|---|---|---|---|---|---|
| Percent | | Modulus at 100% | | | Hexane Extraction | | |
| DOP in Blend | Hallcomid or DOZ in Blend | DOP/M 18–OL | DOP/ M–12 | DOP/ DOZ | DOP/M 18–OL | DOP/ M–12 | DOP/ DOZ |
| 100 | 0 | 1,020 | 1,020 | 1,020 | 27.51 | 27.51 | 27.51 |
| 75 | 25 | 790 | 741 | 850 | 24.39 | 26.68 | 27.63 |
| 50 | 50 | 670 | 617 | 850 | 23.62 | 27.89 | 30.13 |
| 25 | 75 | 557 | 439 | 820 | 24.21 | 28.71 | 32.18 |
| 0 | 100 | 520 | 491 | 815 | 23.21 | 22.54 | 34.33 |

TABLE 7B
[DOP—Blends—70 Parts Total Plasticizer]

| Column 1 | Column 1a | Masland Cold Crack | | | | | | | | | | | | | |
|---|---|---|---|---|---|---|---|---|---|---|---|---|---|---|---|
| | | Column 2 | | | | | | | Column 3 | | | | | | |
| Percent | | VOP/M 18–OL | | | | | | | DOP/M–12 | | | | | | |
| DOP in Blend | Hallcomid or DOZ in Blend | 0 | −10 | −20 | −30 | −40 | −50 | −60 | 0 | −10 | −20 | −30 | −40 | −50 | −60 |
| 100 | 0 | E | E | C | AA | | | | E | E | C | AA | | | |
| 75 | 25 | E | E | | E | A | A | | | | | | | | |
| 50 | 50 | E | E | | E | D | D | AA | | | | | | | |
| 25 | 75 | E | E | | E | D | D | AA | | | | | | | |
| 0 | 100 | E | E | | E | E | E | D | | | E | | E | D | D |

In the first column is given the percentage of DOP in the total blended plasticizer. Thus 100%, 75%, 50%, 25%, and 0% of DOP are used; and conversely, 0%, 25%, 50%, 75%, and 100% of the Hallcomids or DOZ are used. In these tests 70 parts total plasticizers is used, thus in line 2 of Table 7 the percent DOP is 75% or 0.75×70=52.5 parts and the percent of Hallcomid M 18-OL is 0.25×70=17.5 parts.

Table 7A shows clearly that when Hallcomids M 18-OL or M-12 is part of the total plasticizer used, the modulus drops very sharply, showing the high efficiency of these Hallcomids as a plasticizer in blends as contrasted with DOZ. Columns 2 and 3 show that the drop in modulus at the 25% DOP level is equal to or better than 50%, whereas column 4 shows a drop of only about 20%. According to this method of evaluating efficiency, the Hallcomids are 2.5 times as efficient as DOZ.

The effect on hexane extraction is shown in columns 5, 6 and 7. In columns 5 and 6 the figures show that the hexane extractions remain the same or decrease as more amide is added. Thus, even though the modulus is much lower and markedly improved, the hexane extraction is unchanged or improved. Column 7, on the other hand, shows not only that the hexane extraction increases as the modulus improves, but considering the small improvement of modulus of the DOP-DOZ blends as compared to the amide blends, the percent hexane extraction is large.

The beneficial effect of Hallcomids on the cold crack test is shown in Table 7B. As the table shows, increasing the percentage of the amide portion of 25 percent of the total plasticizer drops the cold crack temperature from −30° F. to −40° F. in the blend with DOP. As more amide is added the cold crack improves to better than −60° F. with both Hallcomid M 18-OL and M-12.

EXAMPLE 8

Example 8 is given to show the effect on modulus of the amides when a lower level of total plasticizer is used.

TABLE 8A
[DOP Blends—40 parts total plasticizer]

| Percent DOP in Blend | Modulus at 100% | | |
|---|---|---|---|
| | DOP/M 18-OL | DOP/M-12 | DOP/DOZ |
| 100 | 2,566 | 2,566 | 2,566 |
| 75 | 1,992 | 1,917 | 2,255 |
| 50 | 1,754 | 1,729 | 2,046 |
| 25 | 1,672 | 1,319 | 1,972 |
| 0 | 1,555 | 1,072 | 1,907 |

TABLE 8B

| Plasticizer Blend | Modulus | Hexane Extraction |
|---|---|---|
| 75% DOP: 25% M 18-OL | 1,992 | 5.2 |
| 75% DOP: 25% M-12 | 1,917 | 6.27 |
| 25% DOP: 75% DOZ | 1,972 | 11.55 |

Table 8A shows that the trend of the amides of this invention in lowering of modulus at the 40 part level continues to be superior to plasticizers presently considered to be very efficient, for example DOZ. At the 25% level of addition to DOP the efficiency of Hallcomid M 18-OL in lowering modulus is 22% compared to 12% for DOZ or about 1.8 times better than DOZ.

The N,N-dimethyl lauramide (Hallcomid M-12) is even more efficient since it lowers the modulus 25 percent as compared to 12 percent for DOZ. It is over twice as efficient as DOZ at this level. At 50% blends to 75% blends the present amides continue to show superiority. Hallcomid M 18-OL is 2.5 times as efficient as DOP at this level and Hallcomid M-12 is about 3.5 times as efficient at this level.

Table 8B shows that at equal modulus levels the hexane extraction is improved about two-fold.

The above examples of the Hallcomids with and without blends with other plasticizers are not given with the intent to limit the invention to the specific examples. It can be asumed that blends of the Hallcomids with other types of plasticizers would give similar beneficial results. Such plasticizers may be derived from monobasic and dibasic aliphatic and aromatic acids and alcohols, glycols and polyols. Examples of such ester plasticizers are dioctyl phthalate, dioctyl azelate, dioctyl adipate, dibutyl sebacate, dioctyl isophthalate; polyesters, of adipic acid, sebacic acid and azelaic acid with glycols such as ethylene and propylene glycol, diethylene glycol, and polyethylene glycols; butyl stearate and methyl oleate. The plasticizers may also be derived from phosphoric acid such as tricresyl phosphate and tributyl phosphate and other aryl and alkyl phosphates.

Oil extenders as secondary plasticizers may also be used. Examples of such extenders are Mobisol K (a medium molecular weight aromatic oil), Mobisol N (a synthetic aromatic oil), Conoco H-35 (a synthetic hydrocarbon oil) and Panoflex (a polyaromatic hydrocarbon oil).

The vinyl chloride polymer compositions of this invention may be employed for the same uses as vinyl chloride polymers plasticized with standard plasticizers. They may be used in coated fabrics and other coated articles. They may be used as a flexible binder in the manufacture of explosives or solid rocket propellants. The compositions of the present invention may also be used alone or blended with other elastomers and polymers to form semi-rigid sheetings, tubing, rods, hose, film (both supported and unsupported) and in various extrusions. They also may be used in various protective articles such as outer and inner garments, foot-wear, gloves, bed sheeting, baby pants, paper coatings, wire coatings and the like.

The invention is covered in the claims which follow.
We claim:
1. A composition of matter consisting essentially of a vinyl chloride polymer and, as a plasticizer for the polymer, a mixture of N,N-dimethyl amide of fatty acids composed largely of the N,N-dimethyl amides of fatty acids of the class consisting of lauric and oleic acids, said polymer being of the class consisting of homopolymers of vinyl chloride and copolymers of vinyl chloride with a minor portion of vinylidene chloride or vinyl acetate.
2. The composition of claim 1 in which the amide of the class is the N,N-dimethyl amide of lauric acid.
3. The composition of claim 1 in which the amide of the class is the N,N-dimethyl amide of oleic acid.
4. The composition of claim 1 which includes a polymer of ethylene glycol and an acid of the class consisting of azelaic and adipic acids.

References Cited

UNITED STATES PATENTS 2,325,947   8/1943   Garvey.

FOREIGN PATENTS 730,393   5/1955   Great Britain.

OTHER REFERENCES

Buttrey: Plasticizers; Franklin Publishing Co., Inc.; 1960; pages 150, 151; Sci. Lib., TP 1120 B9.

MORRIS LIEBMAN, *Primary Examiner.*

L. T. JACOBS, *Assistant Examiner.*

UNITED STATES PATENT OFFICE

Certificate of Correction

Patent No. 3,407,166                                                                October 22, 1968

Vincent P. Kuceski et al.

It is certified that error appears in the above identified patent and that said Letters Patent are hereby corrected as shown below.

The sheet of drawing was inadvertently omitted and should appear as shown below:

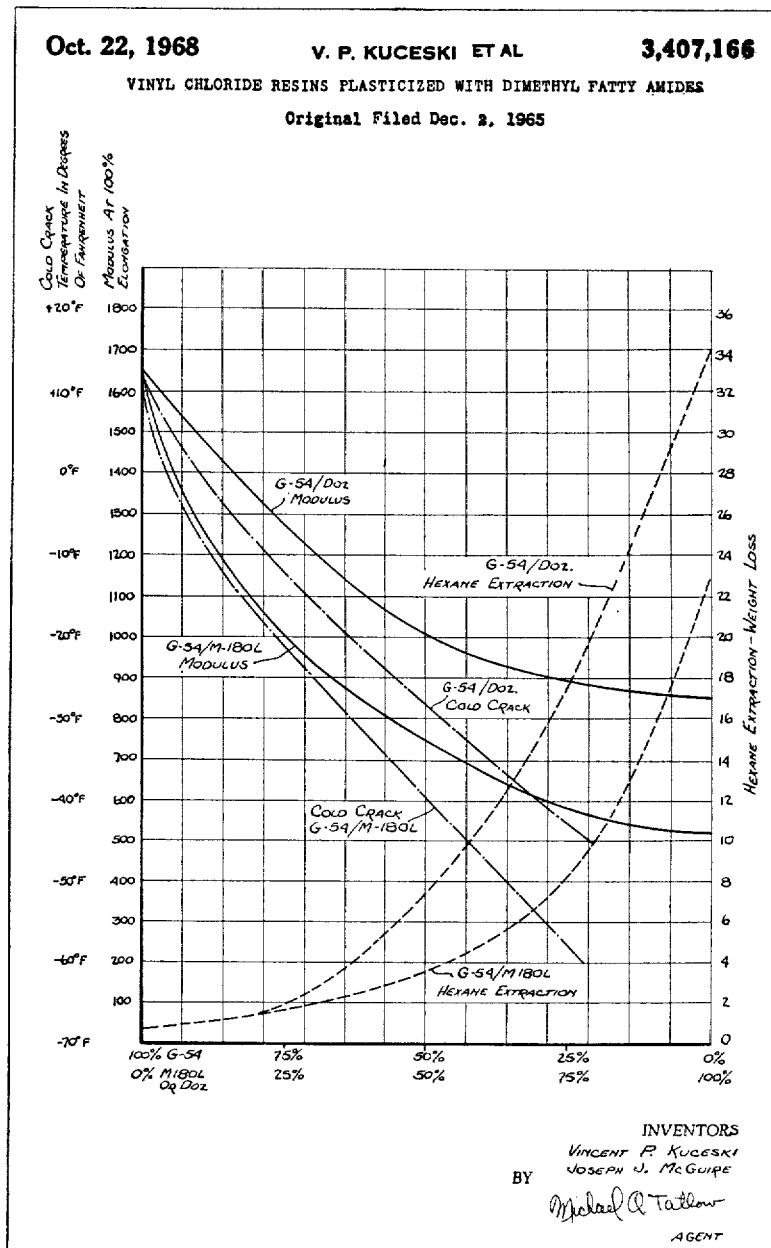

In the heading to the printed specification, line 9, cancel "No Drawing." Column 1, line 27, beginning with "This invention relates" cancel all to and including "employed plasticizers." in line 47, same column 1. Column 10, line 26, cancel "extracted from blends wih the".

Signed and sealed this 10th day of March 1970.

[SEAL]

Attest:

EDWARD M. FLETCHER, JR.
*Attesting Officer.*

WILLIAM E. SCHUYLER, JR.
*Commissioner of Patents.*